June 11, 1929.                J. R. DOWNES                1,717,100
                        SLUDGE DIGESTING APPARATUS
                          Filed Aug. 12, 1926
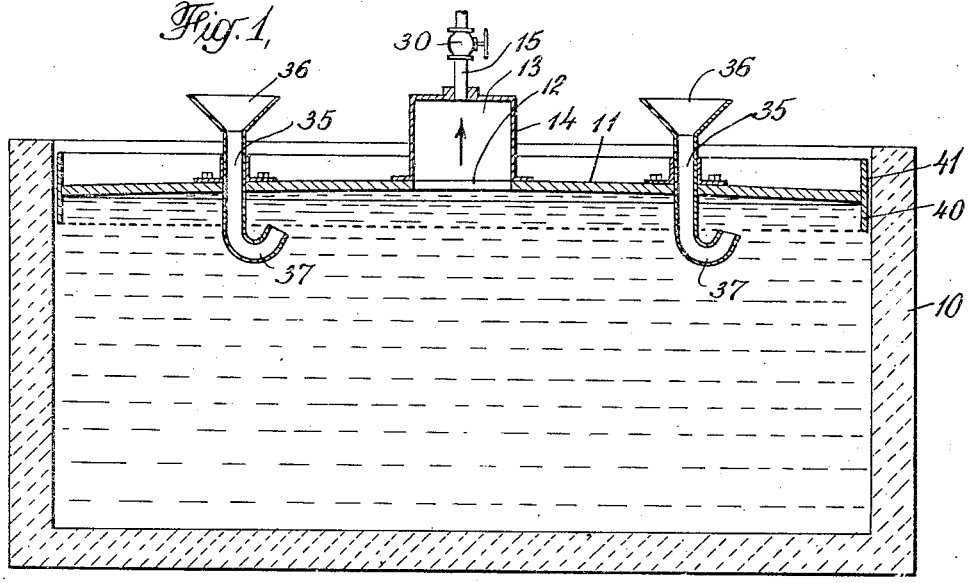
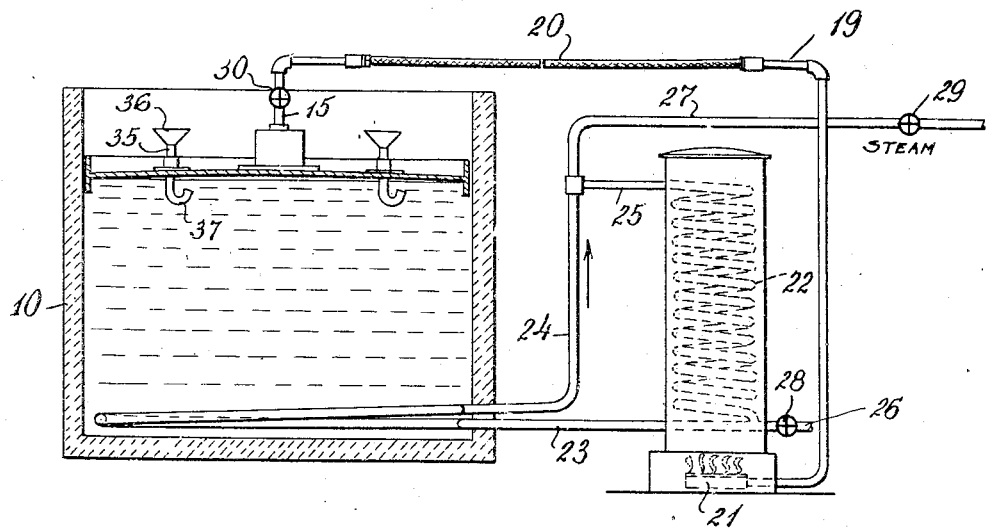
INVENTOR
John R. Downes
BY
Marshall & Hawley
ATTORNEYS Patented June 11, 1929.

1,717,100

UNITED STATES PATENT OFFICE.

JOHN R. DOWNES, OF MIDDLESEX, NEW JERSEY, ASSIGNOR OF ONE-HALF TO S. FISHER MILLER, OF OCEAN COUNTY, NEW JERSEY.

SLUDGE-DIGESTING APPARATUS.

Application filed August 12, 1926. Serial No. 128,901.

This invention relates to apparatus for digesting sewage sludge.

Sludge digesting apparatus or tanks are used for digesting sewage and similar matter and it has been found that such matter is digested much more quickly, more rapidly and more effectively when air is excluded from the apparatus. Furthermore, the exclusion of air precludes danger from explosion. Moreover, it is desirable to prevent the escape of the odors of the gases in the apparatus since they are very obnoxious. Such gases have a potential heat value and can be used to heat the tank or apparatus and for this further reason, it is desirable to collect the gases and to confine them in pipes or conduits whereby they can be utilized.

It is also desirable to prevent evaporation from the tanks as well as to keep air out of the tanks so that the biological development that takes place during the digestion of the sludge will progress most effectively. In cold weather the temperature of the sludge should be higher than the surrounding temperatures and, therefore, the tank should be insulated from cold and, if necessary, heating means should be provided.

With the above problems in mind, this invention has for its salient object to provide sludge digesting apparatus so constructed and arranged that the tank or digester will be sealed, preventing the escape of gases and the admission of air thereto.

Another object of the invention is to provide a seal that will operate regardless of the amount of material in the tank or digester and will keep all solids submerged.

Another object of the invention is to provide a sludge tank seal having provision for admitting sludge to the tank without permitting the escape of gas therefrom.

Another object of the invention is to provide a sludge tank sealing device so constructed that the gases formed in the digester can be collected and controlled whereby the gas can be used for heating or other purposes.

Further objects of the invention will appear from the following specification taken in connection with the drawings, which form a part of this application, and in which Fig. 1 is a vertical sectional elevation of a device constructed in accordance with the invention; and Fig. 2 is a sectional elevation taken substantially at right angles to Fig. 1 and showing one manner of utilizing the gases collected in and removed from the sludge tank.

The invention briefly described consists of sludge digesting apparatus comprising a sludge tank of any desired construction and a cover for the tank adapted to float on the surface of the sludge and having means whereby the clearance space between the cover and the wall of the tank is sealed, thus preventing the admission of air to the tank and the escape of gases from the tank. The cover may be formed of any suitable material but is preferably of such weight that it will float on the sludge but will also exert a downward pressure thereon sufficient to keep all solid matter submerged.

Means is provided in the cover for admitting sludge to the tank, this means being so constructed that no gas can escape and no air can be admitted therethrough. The cover, furthermore, has means for collecting the gases formed in the tank and the gases can be piped or conducted to a burner for heating the tank in winter.

Further details of the invention will appear from the following description.

In the particular form of the embodiment illustrated, there is shown a sludge tank 10 which may be formed of concrete or other suitable material. The top of the tank is closed by a cover 11 which may be formed of wood or, if desired, of metal. The cover is of such weight that it will float on the top of the sludge in the tank but at the same time will exert a downward pressure on the material, thereby submerging all solid matter therein. This is desirable for the most effective conduct of the process.

The cover 11 is preferably slightly domed so that the central portion thereof is slightly elevated above the remaining portions. The central portion has an opening 12 formed therein and a chamber 13 is formed above the opening by a casing 14. The chamber is provided for collecting the gases formed during the digestion of the sludge and an outlet pipe 15 is connected to the casing 14 for conducting gases away from the apparatus.

In Fig. 2 the pipe 15 is connected to a pipe 19 through a flexible pipe 20. The pipe 19 has secured to the end thereof a heating burner 21 disposed below a coil 22 through which water or other suitable heating medium can circulate. A pipe 23 leads from the coil 22 into the tank 10 adjacent the bottom thereof and the water or other heating medium is returned to the coil 22 through a pipe 24 and pipe 25. As an alternative, steam or other suitable heating medium may be conducted to the pipe 23 by a pipe 26 and from the pipe 24 by a pipe 27. Valves 28 and 29 are provided for controlling the passage of the heating medium through the pipes 26 and 27. A valve 30 is provided in the pipe 15 for controlling the passage of the gas from the chamber 13 into the pipe 20.

The cover 11 has extending therethrough a plurality of sludge admission pipes 35 having funnels 36 at their upper ends and elbows 37 at their lower ends. The elbows 37 form traps for preventing the admission of air to the tanks through the pipes 35 and for preventing the escape of gas through the pipes 35 from the tank.

In order to form an effective seal between the cover 11 and the walls of the tank 10, the cover has secured to its outer periphery a downwardly extending flange 40 and an upwardly extending flange 41. A liquid seal is formed between the walls of the tank and the flange 40, thus preventing the entrance of air and the escape of gas. The upwardly extending flange 41 may or may not be used, but is desirable particularly if the cover is formed of metal since this flange adds to the buoyancy of the cover.

From the foregoing description it will be seen that simple, practical and effective apparatus has been designed and that the objects above enumerated will be effectively accomplished by means of the structure described. In other words, the cover constructed as described will prevent the admission of air to the tank, will prevent the escape of gases from the tank and will collect the gases formed in the apparatus and permit the use of these gases for heating or other purposes. Furthermore, means is provided for admitting sludge to the tank without permitting the entrance of air or the escape of gas. These structural features are important, particularly the gas collecting chamber centrally of a concave floating cover, and perform a function in the digestion of sludge, in that the travel of the gas along the inside of the floating cover from the periphery to the center over and through the solids forced against the underside of the cover by their buoyancy slightly disturbs the floating particles assisting them to free themselves from their surface coating of toxic by products or end products, which would inhibit complete digestion.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. Sludge digesting apparatus comprising a tank, a cover adapted to float on the material in the tank with its under surface in contact with said material and having a flange extending downwardly from the outer edge thereof and disposed close to but spaced from the inner edge of the tank, a gas collecting chamber above and connected to said cover, the under surface of said cover sloping upwardly to said chamber.

2. Sludge digesting apparatus comprising a tank, a cover adapted to float on the material in the tank with its under surface in contact with said material having a flange extending downwardly from the outer edge thereof and disposed close to but spaced from the inner edge of the tank, a gas collecting chamber above and connected to said cover, the under surface of said cover sloping upwardly to said chamber, and a trapped inlet conduit through the cover for material to be digested.

3. Sludge digesting apparatus comprising a tank, a concave cover adapted to float on the material in the tank having a flange extending downwardly from the outer edge thereof defining the concavity and disposed close to but spaced from the inner wall of the tank, said cover being of such weight that it will float with its under surface on the sludge within the tank but will submerge all solid matter in the sludge.

4. Sludge digesting apparatus comprising a tank, a concave cover adapted to float on the material in the tank and having a flange extending downwardly from the outer edge thereof and defining the concavity and disposed close to but spaced from the inner wall of the tank, said cover having an inlet conduit for the material to be digested.

5. Sludge digesting apparatus comprising a tank, a concave cover adapted to float on the material in the tank having a flange extending downwardly from the outer edge thereof defining the concavity and disposed close to but spaced from the inner wall of the tank, said cover being of such weight that it will float with its under surface on the sludge within the tank but will submerge all solid matter in the sludge and having an inlet conduit for the material to be digested.

6. Sludge digesting apparatus comprising a tank, a concave cover adapted to float on the material in the tank having a flange extending downwardly from the outer edge thereof defining the concavity and disposed close to but spaced from the inner wall of the tank, and a gas collecting chamber above and connected to the cover at the highest point thereof, said cover having an inlet conduit for the material to be digested.

7. The method of digesting sludge, which comprises submerging the solid matter in the sludge and preventing the escape of gases therefrom, moving the gas in the sludge over and through the submerged solids to disturb the floating particles, whereby said floating particles will be freed from their surface coating of toxic by-products or end products which would inhibit complete digestion.

8. The method of digesting sludge, which comprises submerging the solid matter in the sludge and preventing the escape of gases therefrom, moving the gas in the sludge over and through the submerged solids to disturb the floating particles, whereby said floating particles will be freed from their surface coating of toxic by-products or end products, which would inhibit complete digestion, and collecting said gas.

9. The method of digesting sludge, which comprises submerging the solid matter in the sludge and preventing the escape of gases therefrom, moving the gas in the sludge over and through the submerged solids to disturb the floating particles, whereby said floating particles will be freed from their surface coating of toxic by-products or end products, which would inhibit complete digestion, collecting said gas, burning the gas and accelerating the aforesaid digestion by heat produced by the combustion of the gas.

In witness whereof, I have hereunto set my hand this 30 day of July, 1926.

JOHN R. DOWNES.